United States Patent
Zhang et al.

(10) Patent No.: US 10,524,221 B2
(45) Date of Patent: Dec. 31, 2019

(54) BASE STATION, USER EQUIPMENT, AND MEASUREMENT METHOD FOR INTER-BASE STATION CARRIER AGGREGATION

(71) Applicant: Huawei Technologies Co., Ltd., Shenzhen, Guangdong (CN)

(72) Inventors: Hongping Zhang, Shanghai (CN); Qinghai Zeng, Shanghai (CN)

(73) Assignee: Huawei Technologies Co., Ltd., Shenzhen (CN)

(*) Notice: Subject to any disclaimer, the term of this patent is extended or adjusted under 35 U.S.C. 154(b) by 180 days.

(21) Appl. No.: 15/269,277

(22) Filed: Sep. 19, 2016

(65) Prior Publication Data

US 2017/0006566 A1    Jan. 5, 2017

Related U.S. Application Data

(63) Continuation of application No. PCT/CN2014/073781, filed on Mar. 20, 2014.

(51) Int. Cl.
*H04W 56/00* (2009.01)
*H04L 5/00* (2006.01)

(52) U.S. Cl.
CPC .......... *H04W 56/004* (2013.01); *H04L 5/001* (2013.01); *H04W 56/0055* (2013.01)

(58) Field of Classification Search
None
See application file for complete search history.

(56) References Cited

U.S. PATENT DOCUMENTS

2008/0189970 A1* 8/2008 Wang ................ H04W 36/0055
                                                                  33/701
2010/0208674 A1    8/2010 Lee et al.
(Continued)

FOREIGN PATENT DOCUMENTS

CN   101873646 A   10/2010
CN   102045756 A   5/2011
(Continued)

OTHER PUBLICATIONS

Samsung, "Discussion on measurement gap in dual connectivity", 3GPP TSG-RAN WG2 Meeting #85, Feb. 10-14, 2014, 3 pages, R2-140237.
(Continued)

*Primary Examiner* — Hassan A Phillips
*Assistant Examiner* — Gautam Sharma
(74) *Attorney, Agent, or Firm* — Leydig, Voit & Mayer, Ltd.

(57) ABSTRACT

Embodiments of the present invention provide a base station, user equipment, and a measurement method for inter-base station carrier aggregation. The method includes: a primary base station of the UE sends a message include indication information to request the UE report a timing offset between the primary base station and a secondary base station of the UE; the secondary base station calculates a corrected measurement gap information according to a measurement gap information and the timing offset; the secondary base station stops scheduling the UE in a measurement gap period indicated by the corrected measurement gap information. In the embodiments of the present invention, the secondary base station does not schedule user equipment in a measurement gap period of the UE, which avoids waste of an air interface resource and improves the network transmission efficiency.

22 Claims, 8 Drawing Sheets

(56) References Cited

U.S. PATENT DOCUMENTS

| | | | |
|---|---|---|---|
| 2011/0281601 A1* | 11/2011 | Ahn | H04W 8/24 |
| | | | 455/500 |
| 2012/0088516 A1 | 4/2012 | Ji et al. | |
| 2012/0100885 A1 | 4/2012 | Shimonabe et al. | |
| 2012/0113866 A1* | 5/2012 | Tenny | H04W 24/10 |
| | | | 370/254 |
| 2012/0190373 A1* | 7/2012 | Tenny | H04W 56/0015 |
| | | | 455/447 |
| 2012/0236977 A1 | 9/2012 | Zou et al. | |
| 2012/0269180 A1* | 10/2012 | Li | H04L 1/1822 |
| | | | 370/336 |
| 2013/0059610 A1* | 3/2013 | Siomina | H04W 24/10 |
| | | | 455/456.6 |
| 2013/0215736 A1 | 8/2013 | Han et al. | |
| 2013/0229933 A1* | 9/2013 | Ji | H04L 1/0027 |
| | | | 370/252 |
| 2014/0010189 A1* | 1/2014 | Tian | H04L 1/1822 |
| | | | 370/329 |
| 2014/0056395 A1* | 2/2014 | Alriksson | H03G 3/3073 |
| | | | 375/345 |
| 2014/0161070 A1 | 6/2014 | Chang et al. | |
| 2014/0269575 A1 | 9/2014 | Zhang et al. | |
| 2015/0201338 A1* | 7/2015 | Gopal | H04W 36/0088 |
| | | | 370/252 |
| 2015/0208259 A1 | 7/2015 | Ouchi et al. | |
| 2015/0327103 A1* | 11/2015 | Tang | H04W 24/10 |
| | | | 370/252 |
| 2016/0242058 A1* | 8/2016 | Kazmi | H04L 5/001 |
| 2019/0098551 A1 | 3/2019 | Matsuo et al. | |

FOREIGN PATENT DOCUMENTS

| | | |
|---|---|---|
| CN | 102215503 A | 10/2011 |
| CN | 102448107 A | 5/2012 |
| CN | 102572917 A | 7/2012 |
| CN | 102714816 A | 10/2012 |
| CN | 102804878 A | 11/2012 |
| CN | 102907134 A | 1/2013 |
| CN | 102932907 A | 2/2013 |
| CN | 103139911 A | 6/2013 |
| EP | 2624628 A1 | 8/2013 |
| JP | 2009207108 A | 9/2009 |
| WO | 2010150463 A1 | 12/2010 |
| WO | 2013/141194 A1 | 9/2013 |
| WO | 2014021083 A1 | 2/2014 |

OTHER PUBLICATIONS

"3rd Generation Partnership Project; Technical Specification Group Radio Access Network; Evolved Universal Terrestrial Radio Access (E-UTRA); Physical layer; Measurements (Release 11)", 3GPP TS 36.214 V11.1.0, Dec. 2012, 14 pages.

"3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 12)", 3GPP TS 36.300 V12.1.0, Mar. 2014, 209 pages.

"3rd Generation Partnership Project; Technical Specification Group Radio Access Network; Evolved Universal Terrestrial Radio Access (E-UTRA); Radio Resource Control (RRC); Protocol specification (Release 12)", 3GPP TS 36.331 V12.1.0, Mar. 2014, 356 pages.

NTT Docomo, Inc., "Additional framework for Dual Connectivity," R1-140548, Re-submission of R2-134120, 3GPP TSG-RAN WG2 #85, Prague, Czech Republic, Feb. 10-14, 2014, 2 pages.

NSN, Nokia Corporation, "UE observed Power imbalance and Time offset for Non-collocated Intra-band NC CA," R4-140642, 3GPP TSG-RAN WG4 Meeting #70, Prague, Czech Republic, Feb. 10-14, 2014, 8 pages.

* cited by examiner

BASE STATION, USER EQUIPMENT, AND MEASUREMENT METHOD FOR INTER-BASE STATION CARRIER AGGREGATION

CROSS-REFERENCE TO RELATED APPLICATIONS

This application is a continuation of International Application No. PCT/CN2014/073781, filed on Mar. 20, 2014, the disclosure of which is hereby incorporated by reference in its entirety.

TECHNICAL FIELD

Embodiments of the present invention relate to communications technologies, and in particular, to a base station, user equipment, and a measurement method for inter-base station carrier aggregation.

BACKGROUND

As mobile communications systems develop, the systems can provide increasingly high quality of service. To maintain long-term competitive advantages of the 3rd Generation Partnership Project (3GPP) for mobile communications, and further improve system spectrum efficiency and a user throughput, carrier aggregation (CA) is introduced. Carrier aggregation refers to that user equipment (UE) can simultaneously use multiple cells to perform uplink and downlink communication, to support high-speed data transmission.

Carrier aggregation may be intra-base station carrier aggregation or inter-base station carrier aggregation. Intra-base station carrier aggregation refers to that for one UE, aggregated serving cells all belong to a same base station. Inter-base station carrier aggregation refers to that for one UE, in multiple serving base stations, one base station may be a primary base station (Primary Base Station or Master Base Station), or is referred to as an anchor base station, and another base station may be a secondary base station, where the primary base station is used to perform more control functions. In Long Term Evolution (LTE) or LTE-Advanced (LTE-A), the primary base station may also be referred to as a Primary eNB (PeNB) or a Master eNB (MeNB).

After the inter-base station carrier aggregation is introduced, how to design a measurement mechanism is a problem that needs to be resolved in the present invention.

SUMMARY

Embodiments of the present invention provide a base station, user equipment, and a measurement method for inter-base station carrier aggregation, to resolve a problem of how to design a measurement mechanism for inter-base station carrier aggregation.

According to a first aspect, an embodiment of the present invention provides a base station, including:

an acquiring module, configured to acquire corrected measurement gap information, where the corrected measurement gap information is acquired according to measurement gap information and a timing offset between the base station and a secondary base station of UE, and the measurement gap information is used by the base station to instruct the UE to perform measurement in a measurement gap period indicated by the measurement gap information; and a sending module, configured to send the corrected measurement gap information to the secondary base station, so that the secondary base station stops scheduling the UE in a measurement gap period indicated by the corrected measurement gap information.

With reference to the first aspect, in a first possible implementation manner of the first aspect, the acquiring module is specifically configured to:

calculate the corrected measurement gap information according to the measurement gap information and the timing offset; or receive the corrected measurement gap information that is calculated according to the measurement gap information and the timing offset and that is sent by the UE.

With reference to the first implementation manner of the first aspect, in a second implementation manner of the first aspect, the sending module is further configured to:

send a request message to the UE, where the request message is used to request the UE to acquire the timing offset and report the timing offset to the primary base station; or send a message including indication information to the UE, where the indication information is used to request the UE to report the timing offset; or the acquiring module is further configured to receive, by using an opportunity that is negotiated with the UE in advance and that is used to report the timing offset, the timing offset reported by the UE.

With reference to the first aspect, in a third implementation manner of the first aspect, the sending module is further configured to send a Radio Resource Control (RRC) connection reconfiguration message to the UE, where the RRC connection reconfiguration message includes the measurement gap information; and the acquiring module is specifically configured to receive an RRC connection reconfiguration complete message sent by the UE, where the RRC connection reconfiguration complete message includes the corrected measurement gap information that is calculated by the UE according to the measurement gap information and the timing offset.

With reference to the first aspect or any one of the first to third implementation manners of the first aspect, in a fourth implementation manner of the first aspect, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

With reference to the first aspect or any one of the first to fourth implementation manners of the first aspect, in a fifth implementation manner of the first aspect, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

According to a second aspect, an embodiment of the present invention provides a base station, including:

an acquiring module, configured to acquire corrected measurement gap information, where the corrected measurement gap information is acquired according to measurement gap information and a timing offset between a primary base station of a UE and the base station, and the measurement gap information is used by the primary base station to instruct the UE to perform measurement in a measurement gap period indicated by the measurement gap information; and a processing module, configured to stop scheduling the UE in a corrected measurement gap period indicated by the corrected measurement gap information.

With reference to the second aspect, in a first possible implementation manner of the second aspect, the acquiring module is specifically configured to:

receive the corrected measurement gap information sent by the primary base station; or calculate the corrected measurement gap information according to the measurement gap information and the timing offset.

With reference to the second aspect or the first implementation manner of the second aspect, in a second implementation manner of the second aspect, the acquiring module is specifically configured to:

receive the corrected measurement gap information that is calculated by the primary base station according to the measurement gap information and the timing offset; or receive the corrected measurement gap information that is calculated by the UE according to the measurement gap information and the timing offset and that is sent by the primary base station; or calculate the corrected measurement gap information according to the measurement gap information and the timing offset.

With reference to the second aspect or the first or second implementation manner of the second aspect, in a third implementation manner of the second aspect, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

With reference to the second aspect or any one of the first to third implementation manners of the second aspect, in a fourth implementation manner of the second aspect, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

According to a third aspect, an embodiment of the present invention provides a UE, including:

a receiving module, configured to receive measurement gap information sent by a primary base station of the UE, where the measurement gap information is used to instruct the UE to perform measurement in a measurement gap period indicated by the measurement gap information; and a sending module, configured to send a timing offset between the primary base station and a secondary base station of the UE to the primary base station, so that the primary base station acquires corrected measurement gap information according to the timing offset; or send, to the primary base station, corrected measurement gap information that is calculated according to the measurement gap information and a timing offset between the primary base station and a secondary base station of the UE, where the corrected measurement gap information is used by the primary base station to instruct the secondary base station to stop scheduling the UE in a measurement gap period indicated by the corrected measurement gap information.

With reference to the third aspect, in a first possible implementation manner of the third aspect, the receiving module is specifically configured to:

receive the measurement gap information that is sent by the primary base station by using a RRC connection reconfiguration message; and the sending module is specifically configured to:

send the corrected measurement gap information to the primary base station by using an RRC connection reconfiguration complete message.

With reference to the third aspect, in a second possible implementation manner of the third aspect, the sending module is specifically configured to:

send the timing offset after a request message sent by the primary base station is received, where the timing offset request message is used to request the UE to acquire the timing offset and report the timing offset to the primary base station; or send the timing offset after a message that includes indication information and that is sent by the primary base station to the UE is received, where the indication information is used to request the UE to acquire the timing offset and report the timing offset to the primary base station; or send the timing offset to the primary base station by using an opportunity that is negotiated with the primary base station in advance and that is used to report the timing offset.

According to a fourth aspect, an embodiment of the present invention provides a measurement method for inter-base station carrier aggregation, including:

acquiring, by a primary base station of a UE, corrected measurement gap information, where the corrected measurement gap information is acquired according to measurement gap information and a timing offset between the primary base station and a secondary base station of the UE, and the measurement gap information is used by the primary base station to instruct the UE to perform measurement in a measurement gap period indicated by the measurement gap information; and sending, by the primary base station, the corrected measurement gap information to the secondary base station, so that the secondary base station stops scheduling the UE in a measurement gap period indicated by the corrected measurement gap information.

With reference to the fourth aspect, in a first implementation manner of the fourth aspect, the acquiring, by a primary base station, corrected measurement gap information includes:

calculating, by the primary base station, the corrected measurement gap information according to the measurement gap information and the timing offset; or receiving, by the primary base station, the corrected measurement gap information that is calculated according to the measurement gap information and the timing offset and that is sent by the UE.

With reference to the first implementation manner of the fourth aspect, in a second implementation manner of the fourth aspect, before the calculating, by the primary base station, the corrected measurement gap information according to the measurement gap information and the timing offset, the method includes:

sending, by the primary base station, a request message to the UE, where the request message is used to request the UE to acquire the timing offset and report the timing offset to the primary base station; or sending, by the primary base station, a message including indication information to the UE, where the indication information is used to request the UE to report the timing offset; or receiving, by the primary base station by using an opportunity that is negotiated with the UE in advance and that is used to report the timing offset, the timing offset reported by the UE.

With reference to the first implementation manner of the fourth aspect, in a third implementation manner of the fourth aspect, the method further includes:

sending, by the primary base station, a RRC connection reconfiguration message to the UE, where the RRC connection reconfiguration message includes the measurement gap information; and the receiving, by the primary base station, the corrected measurement gap information that is calculated according to the measurement gap information and the timing offset and that is sent by the UE specifically includes:

receiving, by the primary base station, an RRC connection reconfiguration complete message sent by the UE, where the RRC connection reconfiguration complete message includes the corrected measurement gap information that is calculated by the UE according to the measurement gap information and the timing offset.

With reference to the fourth aspect or any one of the first to third implementation manners of the fourth aspect, in a fourth implementation manner of the fourth aspect, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

With reference to the fourth aspect or any one of the first to fourth implementation manners of the fourth aspect, in a fifth implementation manner of the fourth aspect, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

According to a fifth aspect, an embodiment of the present invention provides a measurement method for inter-base station carrier aggregation, including:

acquiring, by a secondary base station of a UE, corrected measurement gap information, where the corrected measurement gap information is acquired according to measurement gap information and a timing offset between a primary base station of the UE and the secondary base station, and the measurement gap information is used by the primary base station to instruct the UE to perform measurement in a measurement gap period indicated by the measurement gap information; and stopping scheduling, by the secondary base station, the UE in a measurement gap period indicated by the corrected measurement gap information.

With reference to the fifth aspect, in a first implementation manner of the fifth aspect, the acquiring, by a secondary base station, corrected measurement gap information includes:

receiving, by the secondary base station, the corrected measurement gap information sent by the primary base station of the UE; or calculating, by the secondary base station, the corrected measurement gap information according to the measurement gap information and the timing offset.

With reference to the first implementation manner of the fifth aspect, in a second implementation manner of the fifth aspect, the receiving, by the secondary base station, the corrected measurement gap information sent by the primary base station of the UE includes:

receiving, by the secondary base station, the corrected measurement gap information that is calculated by the primary base station according to the measurement gap information and the timing offset; or receiving, by the secondary base station, the corrected measurement gap information that is calculated by the UE according to the measurement gap information and the timing offset and that is sent by the primary base station.

With reference to the fifth aspect or the first or second implementation manner of the fifth aspect, in a third implementation manner of the fifth aspect, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

With reference to the fifth aspect or any one of the first to third implementation manners of the fifth aspect, in a fourth implementation manner of the fifth aspect, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

According to a sixth aspect, an embodiment of the present invention provides a measurement method for inter-base station carrier aggregation, including:

receiving, by a UE, measurement gap information sent by a primary base station of the UE, where the measurement gap information is used to instruct the UE to perform measurement in a measurement gap period indicated by the measurement gap information; and sending, by the UE, a timing offset between the primary base station and a secondary base station of the UE to the primary base station, so that the primary base station acquires corrected measurement gap information according to the timing offset; or sending, by the UE to the primary base station, corrected measurement gap information that is calculated according to the measurement gap information and a timing offset between the primary base station and a secondary base station of the UE, where the corrected measurement gap information is used by the primary base station to instruct the secondary base station to stop scheduling the UE in a measurement gap period indicated by the corrected measurement gap information.

With reference to the sixth aspect, in a first implementation manner of the sixth aspect, the receiving, by UE, measurement gap information sent by a primary base station includes:

receiving, by the UE, the measurement gap information that is sent by the primary base station by using a RRC connection reconfiguration message; and the sending, by the UE to the primary base station, corrected measurement gap information that is calculated according to the measurement gap information and a timing offset between the primary base station and a secondary base station of the UE includes:

sending, by the UE, the corrected measurement gap information to the primary base station by using an RRC connection reconfiguration complete message.

With reference to the sixth aspect or the first implementation manner of the sixth aspect, in a second implementation manner of the sixth aspect, the sending, by the UE, a timing offset between the primary base station and a secondary base station of the UE to the primary base station includes:

sending, by the UE, the timing offset after receiving a request message sent by the primary base station, where the request message is used to request the UE to acquire the timing offset and report the timing offset to the primary base station; or sending, by the UE, the timing offset after receiving a message that includes indication information and that is sent by the primary base station to the UE, where the indication information is used to request the UE to acquire the timing offset and report the timing offset to the primary base station; or sending, by the UE, the timing offset to the primary base station by using an opportunity that is negotiated with the primary base station in advance and that is used to report the timing offset.

The embodiments of the present invention relate to the base station, the user equipment, and the measurement method for inter-base station carrier aggregation. A primary base station, UE, or a secondary base station calculates corrected measurement gap information according to measurement gap information and a timing offset between a primary base station of the UE and a secondary base station of the UE, and after acquiring the corrected measurement gap information, the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show some embodiments of the present invention, and persons of ordinary skill in the art may still derive other drawings from these accompanying drawings without creative efforts.

DETAILED DESCRIPTION

To make the objectives, technical solutions, and advantages of the embodiments of the present invention clearer, the following clearly and describes the technical solutions in the embodiments of the present invention with reference to the accompanying drawings in the embodiments of the present invention. Apparently, the described embodiments are some but not all of the embodiments of the present invention. All other embodiments obtained by persons of ordinary skill in the art based on the embodiments of the present invention without creative efforts shall fall within the protection scope of the present invention.

Figure 1:
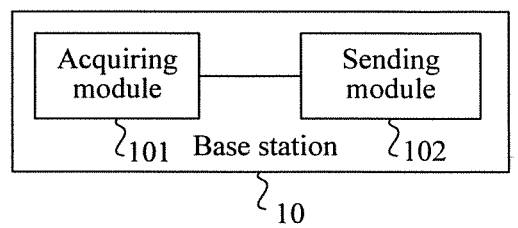
FIG. 1 is a schematic structural diagram of Embodiment 1 of a base station according to the present invention.
Figure 2:
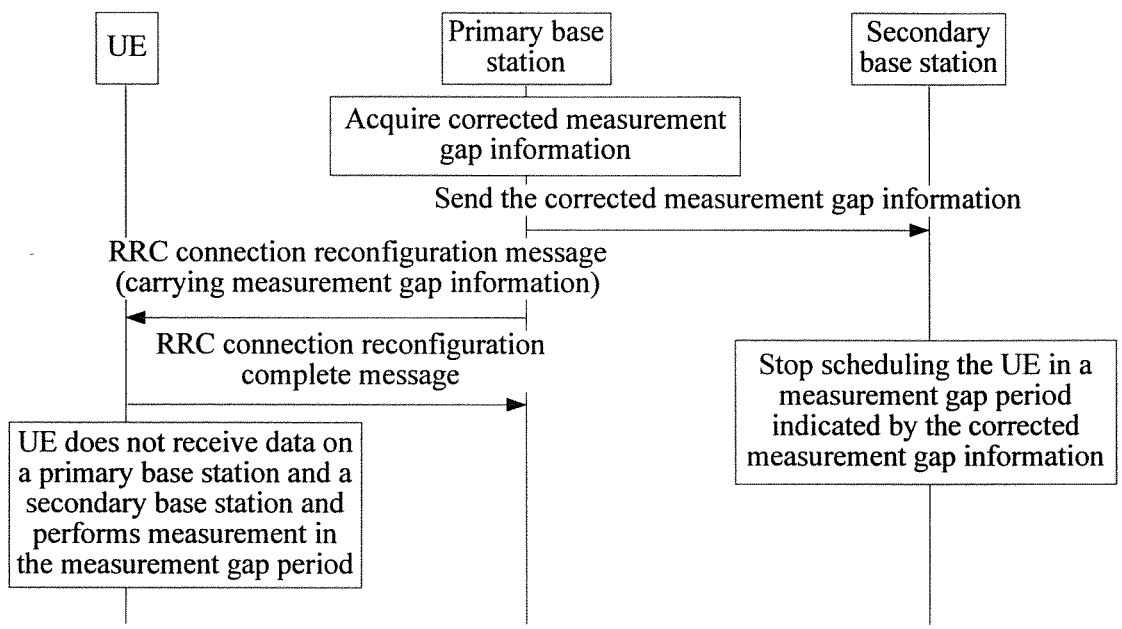
FIG. 2 is a first signaling flowchart of Embodiment 1 of a base station according to the present invention.
Figure 2A:
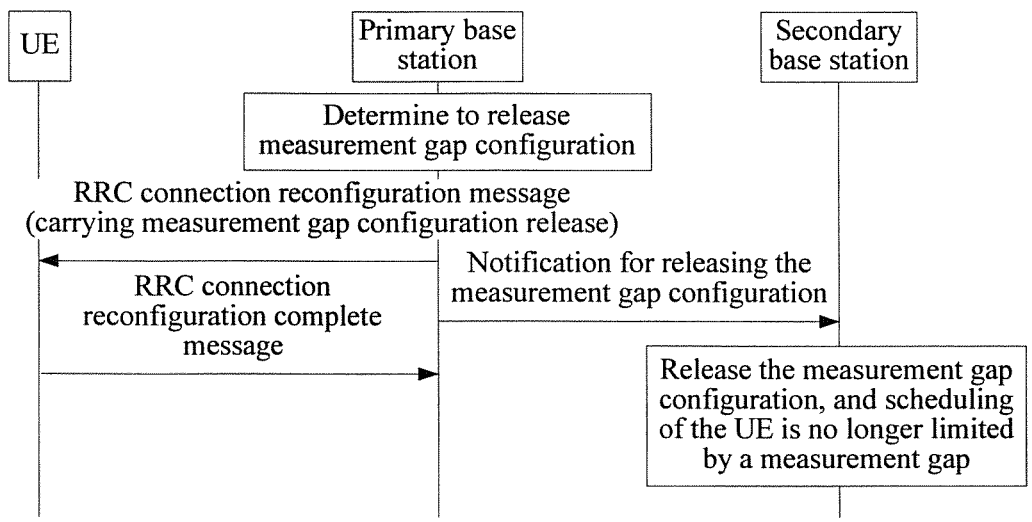
FIG. 2A is a second signaling flowchart of Embodiment 1 of a base station according to the present invention.

FIG. 1 is a schematic structural diagram of Embodiment 1 of a base station according to the present invention. FIG. 2 is a first signaling flowchart of Embodiment 1 of a base station according to the present invention. FIG. 2A is a second signaling flowchart of Embodiment 1 of a base station according to the present invention. This embodiment may be executed by a primary base station of UE, and the primary base station may be implemented by using software and/or hardware. The solution of this embodiment is applied to a primary base station, a secondary base station, and user equipment, to implement measurement gap configuration for inter-base station carrier aggregation. As shown in FIG. 1, a base station 10 in this embodiment includes: an acquiring module 101 and a sending module 102. The acquiring module 101 is configured to acquire corrected measurement gap information, where the corrected measurement gap information is acquired according to measurement gap information and a timing offset between the base station and a secondary base station of the UE, and the measurement gap information is used by the base station to instruct the UE to perform measurement in a measurement gap period indicated by the measurement gap information; and the sending module 102 is configured to send the corrected measurement gap information to the secondary base station, so that the secondary base station stops scheduling the UE in a measurement gap period indicated by the corrected measurement gap information.

Specifically, as shown in FIG. 2, the sending module 102 of the base station 10 sends the corrected measurement gap information acquired by the acquiring module 101 to the secondary base station. After receiving the corrected measurement gap information, the secondary base station does not schedule the UE in the corrected measurement gap period, that is, in the corrected measurement gap period, neither information nor data is transferred between the UE and the secondary base station, where the corrected measurement gap information is calculated according to the measurement gap information and the timing offset. For inter-base station carrier aggregation, the primary base station and the secondary base station of the UE may be asynchronous, and the timing offset refers to a timing offset between the primary base station of the UE and the secondary base station of the UE, or may be understood as a timing offset between a cell of the primary base station and a cell of the secondary base station. The timing offset is generally a time offset relative to a primary cell (Primary Cell, PCell for short) of the primary base station of the UE, that is, a time offset between the primary cell and any cell of the secondary base station. Serving cells of the primary base station of the UE may be considered as a master cell group (Master Cell Group), and all serving cells of each secondary base station may be considered as a secondary cell group (Secondary Cell Group). For a cell group, the timing offset refers to a timing offset between a master cell group and a secondary cell group. It should be noted that this embodiment of the present invention is described by using the primary base station and the secondary base station, but is also applicable to the concept of a cell group.

As shown in FIG. 2, when, before, or after sending the corrected measurement gap information to the secondary base station, the sending module 102 of the base station 10 may send the measurement gap information to the UE by using an RRC connection reconfiguration message; and after receiving the measurement gap information, the UE replies with a response message, that is, an RRC connection reconfiguration complete message to the primary base station, and the UE does not receive data on the primary base station and the secondary base station and performs measurement in the measurement gap period indicated by the measurement gap information.

The foregoing method avoids that if the secondary base station schedules the UE in the measurement gap period indicated by the primary base station, the UE cannot receive or send data because the UE is performing measurement in the measurement gap period, which results in waste of an air interface resource.

When the primary base station determines to release measurement gap configuration of the UE, the primary base station also sends a notification to the secondary base station, so that the secondary base station releases the measurement gap configuration, and is no longer limited by a measurement gap when scheduling the UE. As shown in FIG. 2A, the primary base station may send, to the secondary base station by using a measurement gap notification message or a UE information update message, a message for releasing the measurement gap configuration, and the primary base station may send a release message to the UE by using an RRC connection reconfiguration message, where a sequence of sending the messages to the UE and the secondary base station is not limited.

Optionally, the sending module 102 is specifically configured to:
send the corrected measurement gap information to the secondary base station by using a notification message or an update message.

Specifically, the sending module 102 may send the corrected measurement gap information to the secondary base station of the UE by using a measurement gap notification (Measurement gap notify) message or a UE information update (UE information update) message.

In this embodiment, a base station acquires corrected measurement gap information that is calculated according to measurement gap information and a timing offset between a primary base station of UE and a secondary base station of the UE, and sends the corrected measurement gap information to the secondary base station, so that the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

Figure 3:
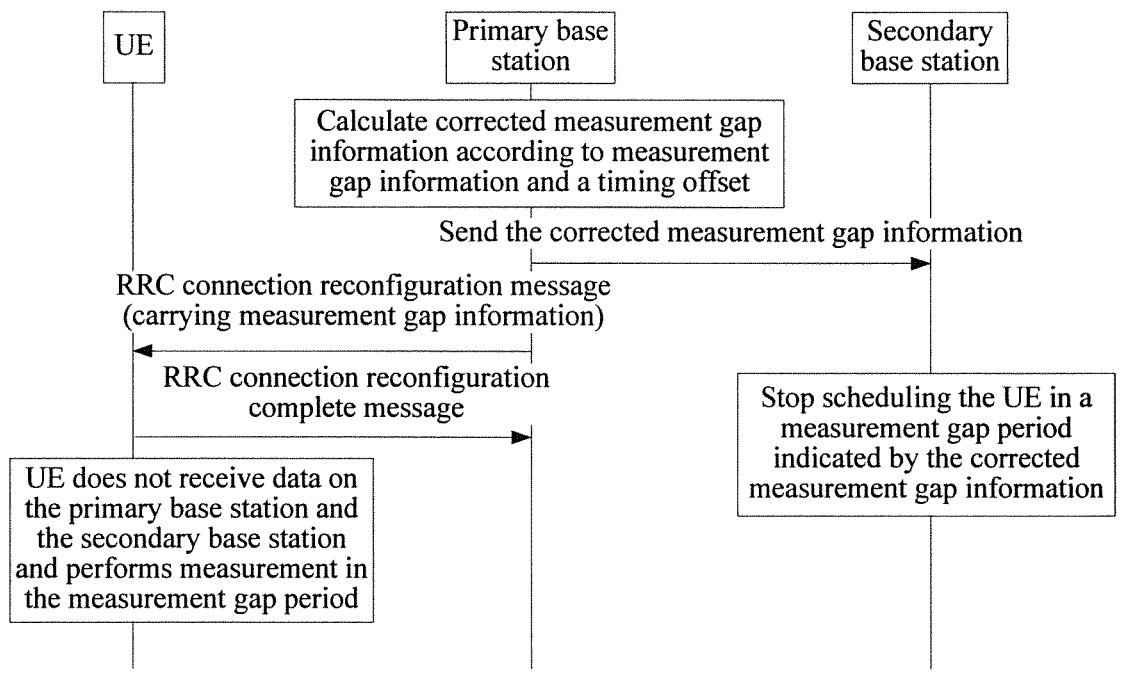
FIG. 3 is a first signaling flowchart of Embodiment 2 of a base station according to the present invention.
Figure 4:
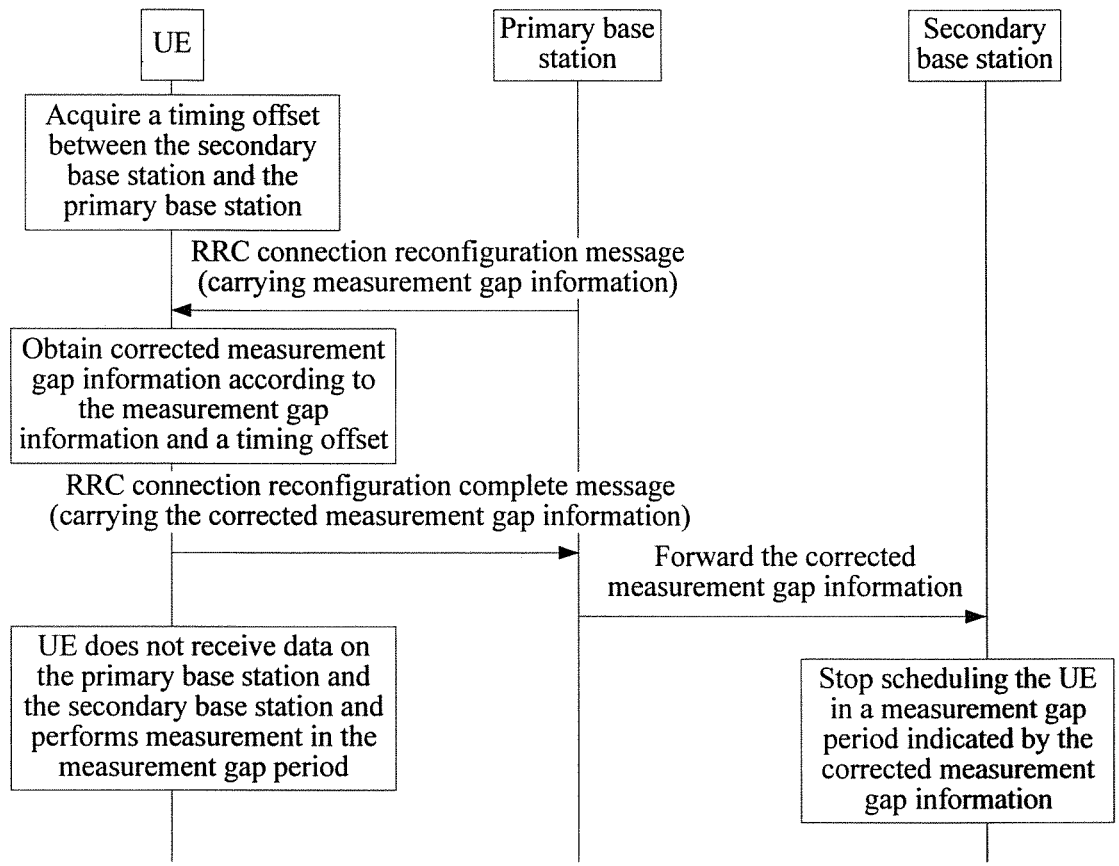
FIG. 4 is a second signaling flowchart of Embodiment 2 of a base station according to the present invention.
Figure 5:
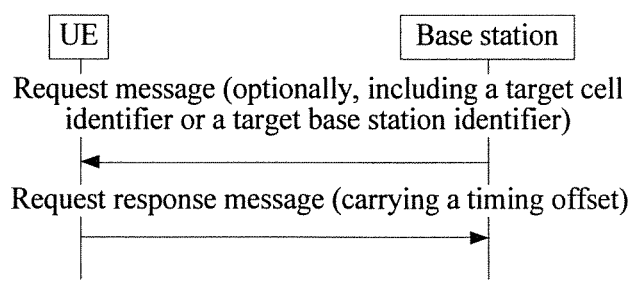
FIG. 5 is a third signaling flowchart of Embodiment 2 of a base station according to the present invention.
Figure 6:
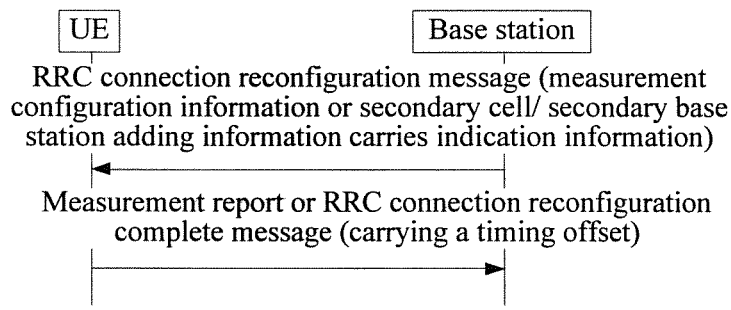
FIG. 6 is a fourth signaling flowchart of Embodiment 2 of a base station according to the present invention.
Figure 7:
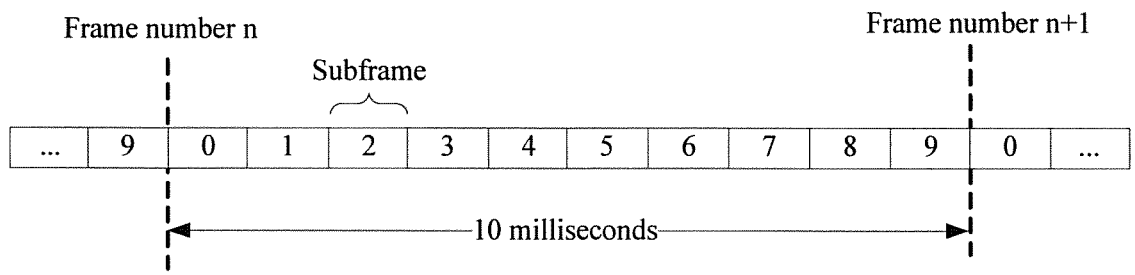
FIG. 7 is a schematic diagram of a frame format in Embodiment 2 of a base station according to the present invention.
Figure 8:
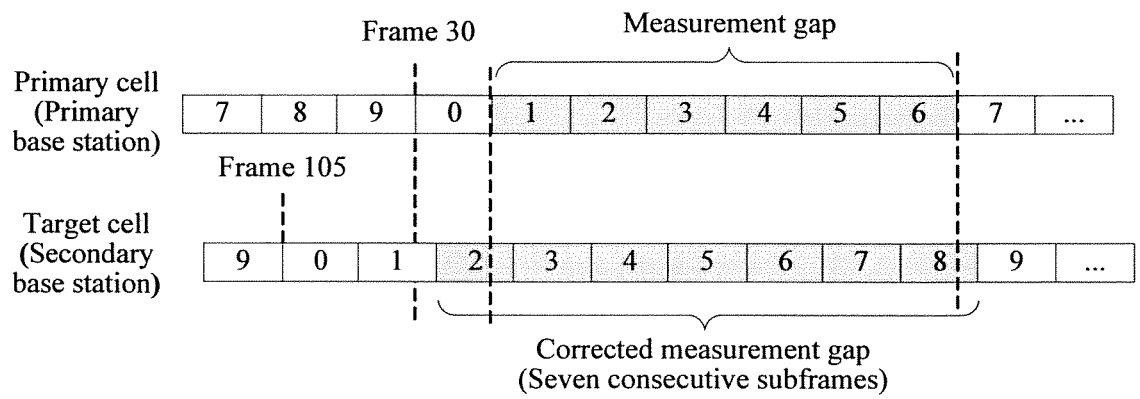
FIG. 8 is a schematic diagram of a frame format including a measurement gap in Embodiment 2 of a base station according to the present invention.

FIG. 3 is a first signaling flowchart of Embodiment 2 of a base station according to the present invention, FIG. 4 is a second signaling flowchart of Embodiment 2 of a base station according to the present invention, FIG. 5 is a third signaling flowchart of Embodiment 2 of a base station according to the present invention, FIG. 6 is a fourth signaling flowchart of Embodiment 2 of a base station according to the present invention, FIG. 7 is a schematic diagram of a frame format in Embodiment 2 of a base station according to the present invention, and FIG. 8 is a schematic diagram of a frame format including a measurement gap in Embodiment 2 of a base station according to the present invention. Based on the embodiment shown in FIG. 1, further, the foregoing acquiring module 101 in the primary base station in this embodiment is specifically configured to:
calculate the corrected measurement gap information according to the measurement gap information and the timing offset; or
receive the corrected measurement gap information that is calculated according to the measurement gap information and the timing offset and that is sent by the UE.

Specifically, as shown in FIG. 3, the acquiring module 101 of the base station 10 calculates the corrected measurement gap information according to the measurement gap information and the timing offset, and the sending module 102 sends the calculated corrected measurement gap information to the secondary base station. A specific method for acquiring the timing offset may be: The primary base station itself monitors cells of the primary base station and the secondary base station to obtain the timing offset, or the primary base station acquires the timing offset by using the UE. Remaining steps in FIG. 3 are the same as those in Embodiment 1, and details are not described herein again.

Optionally, the sending module 102 is further configured to send a RRC connection reconfiguration message to the UE, where the RRC connection reconfiguration message includes the measurement gap information; and
the acquiring module is specifically configured to receive an RRC connection reconfiguration complete message sent by the UE, where the RRC connection reconfiguration complete message includes the corrected measurement gap information that is calculated by the UE according to the measurement gap information and the timing offset.

Specifically, as shown in FIG. 4, the acquiring module 101 of the base station 10 receives the corrected measurement gap information that is calculated by the UE according to the measurement gap information and the timing offset, where the corrected measurement gap information may be acquired by receiving the RRC connection reconfiguration complete message sent by the UE; and the sending module 102 forwards the corrected measurement gap information to the secondary base station. Before the UE sends the corrected measurement gap information, if the secondary base station is already configured for the UE, the UE acquires the timing offset between the secondary base station and the primary base station (a sequence of performing this step and receiving the RRC connection reconfiguration message carrying the measurement gap information is not limited). Before the corrected measurement gap information is received, the RRC connection reconfiguration message including the measurement gap information may be sent to the UE. Remaining steps are the same as those in Embodiment 1, and details are not described herein again.

Optionally, the sending module 102 is further configured to:

send a request message to the UE, where the request message is used to request the UE to acquire the timing offset and report the timing offset to the base station; or send a message including indication information to the UE, where the indication information is used to request the UE to report the timing offset; or the acquiring module 101 is further configured to receive, by using an opportunity that is negotiated with the UE in advance and that is used to report the timing offset, the timing offset reported by the UE.

Specifically, as shown in FIG. 5, before the corrected measurement gap information is calculated, the sending module 102 of the base station sends the request message, for example, a timing offset request message, to the UE, to request the UE to report the acquired timing offset to the primary base station, where the timing offset request message may further include a target cell identifier or a target base station identifier (in this embodiment, the target cell identifier may be an identifier of a cell of the secondary base station of the UE, and the target base station identifier may be an identifier of the secondary base station). The UE adds the timing offset to a request response message and sends the request response message to the primary base station, for example, adds the timing offset to a timing offset request response message.

In this embodiment, the timing offset is between two cells. For one UE, serving cells of a same base station are synchronous. In an implementation manner of acquiring a timing offset between cells of a base station and a target base station, a primary cell PCell or any serving cell of the primary base station is used as a cell of the primary base station, the target base station is the current secondary base station of the UE or a base station specified in the timing offset request message, and a specified target cell or any serving cell of the target base station is used as a cell of the target base station. That is, for example: the UE acquires a timing offset between any serving cell of the primary base station and any serving cell of the target base station, or the UE acquires a timing offset between the primary cell PCell of the primary base station and any serving cell of the target base station, or the UE acquires a timing offset between the primary cell PCell or any serving cell of the primary base station and a specified target cell, or the like.

Alternatively, as shown in FIG. 6, the sending module 102 of the base station 10 may also add indication information to a message sent to the UE, where the indication message is used to request the UE to report the timing offset, for example, add the indication information to measurement configuration information or secondary cell/secondary base station adding information in an RRC connection reconfiguration message, to request the UE to report the timing offset, and the UE adds the timing offset to a measurement report or an RRC connection reconfiguration complete message and sends the measurement report or the RRC connection reconfiguration complete message to the base station. Alternatively, the indication information may also be implicit, for example, the acquiring module 101 receives, by using an opportunity that is negotiated with the UE in advance and that is used to report the timing offset, the timing offset reported by the UE, for example, when the UE receives a secondary cell/secondary base station adding request, the UE automatically adds a timing offset between a currently added secondary cell/secondary base station and the PCell to a response message (an RRC connection reconfiguration complete message).

In consideration of different locations of UEs, transmission delays after which radio signals arrive at the UEs are different; therefore, timing offsets acquired from the UEs are more accurate.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period (that is, the first offset=(the second offset+the timing offset) modulo (the measurement period)).

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

The time gap of the M consecutive subframes and the time gap of the N consecutive subframes separately start from a first offset and a second offset of a measurement period.

In this embodiment, that the N subframes include the M subframes may refer to that a time corresponding to the N subframes cover a time corresponding to the M subframes; or may refer to that the M subframes are a subset of the N subframes.

In this embodiment of the present invention, that M=7 and N=6 is used as an example for description, but it should be noted that only an exemplary description is provided herein, and this embodiment of the present invention is not limited thereto.

Specifically, measurement gaps may be classified into two models: model 0 and model 1. In model 0, 40 milliseconds (a length of four frames) are one measurement period, and a measurement gap is 6 milliseconds (six subframes), and in model 1, 80 milliseconds (a length of eight frames) are one measurement period, and a measurement gap is 6 milliseconds.

As shown in FIG. 7, in an LTE system, a time domain is divided into frame and subframe, one frame occupies 10 milliseconds, one frame includes 10 subframes, and each subframe is 1 millisecond. That the primary base station and the secondary base station are asynchronous refers to that at a same moment, frame numbers and subframe numbers of the primary base station and the secondary base station are different and/or subframe boundaries of the primary base station and the secondary base station are unaligned. The timing offset refers to a difference (because subframe boundaries are unaligned, the difference may have a decimal) between frame numbers of the primary base station and the secondary base station at a same moment and a difference between subframe numbers of the primary base station and the secondary base station at a same moment, or refers to a difference between a time corresponding to a frame number of the primary base station and a time corresponding to the same frame number of the secondary base station and a difference between a time corresponding to a subframe number of the primary base station and a time corresponding to the same subframe number of the secondary base station.

A transmitted timing offset may be obtained by rounding down or rounding up an actual timing offset, to facilitate transmission. A transmitted timing offset may be in different formats, for example, two integers are used, a first integer is a frame difference a, and a second integer is a subframe difference b, or one integer is used to indicate a subframe or millisecond difference (assuming that the difference is c), where actually, c=10*a+b. Certainly, a timing offset of a finer granularity may also be reported, for example, microsecond (μs); however, corresponding signaling overheads are higher. In this embodiment of the present invention, a method of using one integer whose unit is subframe and that is obtained by rounding down is used as an example for description, and other methods are obtained by analogy.

After the timing offset is acquired, a formula for calculating the corrected measurement gap information is as follows:

a corrected measurement gap value=(a measurement gap value+the timing offset)mod 40 or 80.

After correction, the corrected measurement gap information and the measurement gap information include a same measurement period. If a measurement gap model is model 0 (a measurement period of 40 milliseconds), 40 is used to perform a modulo operation in the foregoing formula; and if a measurement gap model is model 1 (a measurement period of 80 milliseconds), 80 is used to perform a modulo operation in the foregoing formula.

The first offset included in the corrected measurement gap information is the corrected measurement gap value in the foregoing formula; and the second offset included in the measurement gap information is the measurement gap value in the foregoing formula.

For a measurement gap sent to the UE, six consecutive subframes starting from the second offset, that is, a measurement gap value indicated by the measurement gap information are a measurement gap period; but for a corrected measurement gap, seven consecutive subframes starting from the first offset, that is, a corrected measurement gap value indicated by the corrected measurement gap information are a measurement gap period, to avoid a problem caused by unaligned subframe boundaries.

For example: as shown in FIG. 8, an actual timing offset is: (105*10+1.x)−30*10=751.x, where x is a difference between subframe boundaries (a difference between a boundary of subframe 1 in frame 105 and a boundary of subframe 0 in frame 30), and a time point of frame 30 of the primary cell is used as a start time. Frame 30 of the primary cell and frame 105 of a target cell are randomly selected values, and are not limited in the present invention. In a manner, a time corresponding to frame 30 of the primary cell is the same as or close to a time corresponding to frame 105 of the target cell.

A transmitted timing offset is obtained by rounding down an actual timing offset, and is 751.

If a measurement gap model is model 0 (the measurement period is 40 milliseconds), and an offset indicated by the measurement gap information is 21 (that is, the second offset) (for a corresponding measurement gap period, refer to a gray part of the primary cell) (a measurement period starts from frame 28, and the measurement period starts from a frame number mod 4=0, or a frame number mod 8=0 (corresponding to model 1)), the first offset included in the corrected measurement gap information is: (751+21) mod 40=12 (for a corresponding corrected measurement gap period, refer to a gray part of the target cell) (the period starts from frame 104), and a measurement gap period lasts for seven subframes, where a measurement gap model is also model 0 (a measurement period is 40 milliseconds).

In this embodiment, a base station acquires corrected measurement gap information that is calculated by the base station itself according to measurement gap information and a timing offset between a primary base station and a secondary base station of UE, or acquires corrected measurement gap information calculated by UE; and sends the corrected measurement gap information to the secondary base station, so that the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

Figure 9:
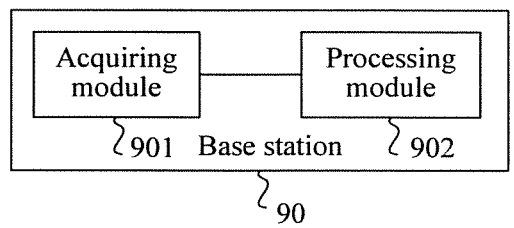
FIG. 9 is a schematic structural diagram of Embodiment 3 of a base station according to the present invention.
Figure 9A:
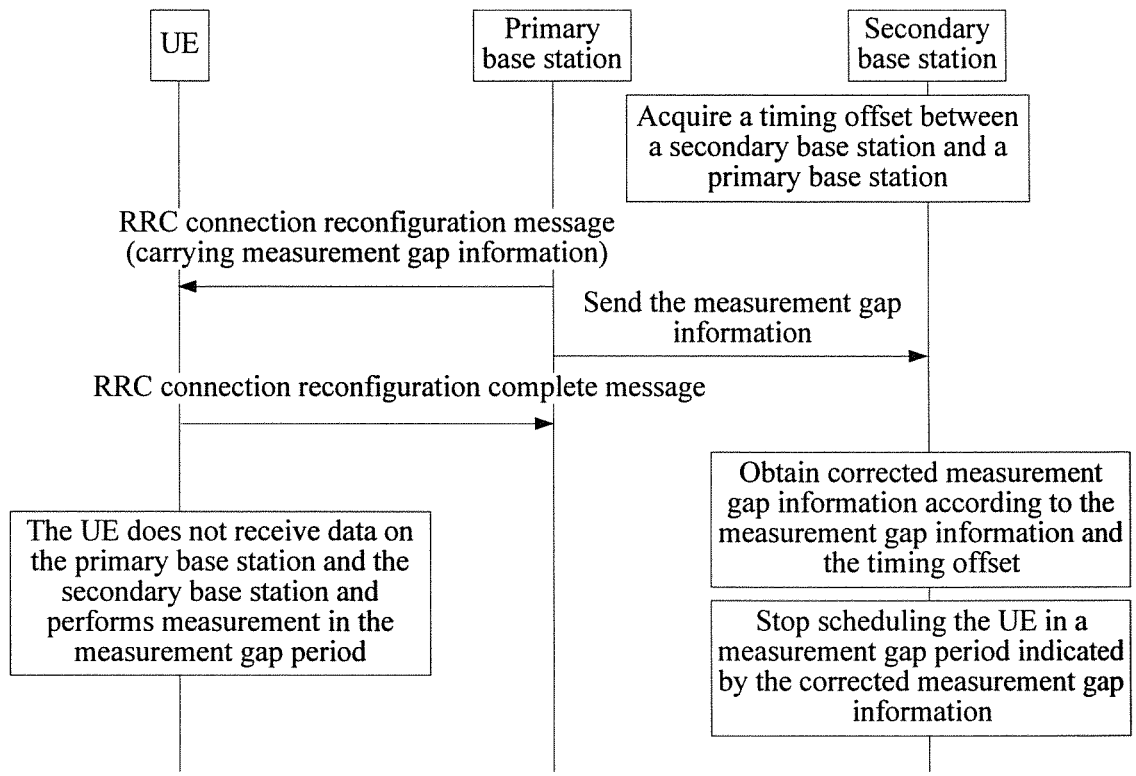
FIG. 9A is a signaling flowchart of Embodiment 3 of a base station according to the present invention.

FIG. 9 is a schematic structural diagram of Embodiment 3 of a base station according to the present invention. FIG. 9A is a signaling flowchart of Embodiment 3 of a base station according to the present invention. This embodiment may be executed by a secondary base station of UE, and the secondary base station may be implemented by using software and/or hardware. The solution of this embodiment is applied to a primary base station, a secondary base station, and user equipment, to implement measurement gap configuration for inter-base station carrier aggregation.

As shown in FIG. 9, a base station 90 in this embodiment includes: an acquiring module 901 and a processing module 902. The acquiring module 901 is configured to acquire corrected measurement gap information, where the corrected measurement gap information is acquired according to measurement gap information and a timing offset between a primary base station of UE and the base station, the measurement gap information is used by the primary base station to instruct the UE to perform measurement in a measurement gap period indicated by the measurement gap information, and the base station is a secondary base station of the UE; and the processing module 902 is configured to stop scheduling the UE in a measurement gap period indicated by the corrected measurement gap information.

Specifically, as shown in FIG. 2, the primary base station sends the acquired corrected measurement gap information to the secondary base station, that is, the base station 90, and after the acquiring module 901 acquires the corrected measurement gap information, the processing module 902 of the base station 90 stops scheduling the UE in the measurement gap period indicated by the corrected measurement gap information, that is, in the corrected measurement gap period, neither information nor data is transferred between the UE and the secondary base station, where the corrected measurement gap information is calculated according to the measurement gap information and the timing offset. For inter-base station carrier aggregation, the primary base station and the secondary base station of the UE may be asynchronous, and the timing offset refers to a timing offset between the primary base station of the UE and the secondary base station of the UE, or may be understood as a timing offset between a cell of the primary base station and a cell of the secondary base station. The timing offset is generally a time offset relative to a primary cell (Primary Cell, PCell for short) of the primary base station of the UE, that is, a time offset between the primary cell and any cell of the secondary base station. Serving cells of the primary base station of the UE may be considered as a master cell group (Master Cell Group), and all serving cells of each secondary base station may be considered as a secondary cell group (Secondary Cell Group). For a cell group, the timing offset refers to a timing offset between a master cell group and a secondary cell group. It should be noted that this embodiment of the present invention is described by using the primary base station and the secondary base station, but is also applicable to the concept of a cell group.

Optionally, the acquiring module 901 is specifically configured to:

receive the corrected measurement gap information sent by the primary base station of the UE; or calculate the corrected measurement gap information according to the measurement gap information and the timing offset.

Optionally, the acquiring module 901 is specifically configured to:

receive the corrected measurement gap information that is calculated by the primary base station according to the measurement gap information and the timing offset; or receive the corrected measurement gap information that is calculated by the UE according to the measurement gap information and the timing offset and that is sent by the primary base station.

Specifically, as shown in FIG. 3, the primary base station sends, to the secondary base station, that is, the base station 90, the corrected measurement gap information that is calculated according to the measurement gap information and the timing offset, and the acquiring module 901 of the base station 90 acquires the corrected measurement gap information. Alternatively, as shown in FIG. 4, the primary base station forwards, to the secondary base station, that is, the base station 90, the corrected measurement gap information that is received and that is calculated by the UE according to the measurement gap information and the timing offset, and the acquiring module 901 of the base station 90 receives the corrected measurement gap information. Alternatively, as shown in FIG. 9A, the acquiring module 901 of the base station 90 calculates the corrected measurement gap information according to the measurement gap information and the timing offset.

As shown in FIG. 9A, when, before, or after the primary base station sends the corrected measurement gap information to the secondary base station, the primary base station may send the measurement gap information to the UE by using an RRC connection reconfiguration message; and after receiving the measurement gap information, the UE replies with a response message, that is, an RRC connection reconfiguration complete message to the primary base station, and the UE does not receive data on the primary base station and the secondary base station and performs measurement in the measurement gap period.

Optionally, the acquiring module 901 is specifically configured to:

acquire the timing offset from the primary base station; or acquire the timing offset from the UE; or acquire the timing offset by means of detection.

Specifically, for an acquiring method, the acquiring module 901 may acquire the timing offset from the primary base station, for example, acquire the timing offset by using a measurement gap notification message or a UE information update message, or acquire the timing offset by using a global process message of an X2/S1 interface; or acquire the timing offset from the UE; or acquire the timing offset by detecting cells of the primary base station and the secondary base station; or the secondary base station serves as a primary base station of another UE, and acquires the timing offset by means of reporting by the another UE.

Optionally, the acquiring module 901 is specifically configured to:

send a request message to the UE, where the request message is used to request the UE to acquire the timing offset and report the timing offset to the secondary base station; or send a message including indication information to the UE, where the indication information is used to request the UE to report the timing offset; or receive, by using an opportunity that is negotiated with the UE in advance and that is used to report the timing offset, the timing offset reported by the UE.

Specifically, as shown in FIG. 5, before calculating the corrected measurement gap information, the secondary base station sends the request message to the UE by using the acquiring module 901, to request the UE to report the acquired timing offset to the secondary base station, where the request message may further include a target cell identifier or a target base station identifier (in this embodiment, the target cell identifier may be an identifier of a cell of the primary base station of the UE, and the target base station identifier may be an identifier of the primary base station); and the UE adds the timing offset to a request response message and sends the request response message to the secondary base station.

Alternatively, as shown in FIG. 6, the acquiring module 901 of the secondary base station may also add indication information to a message sent to the UE, to request the UE to report the timing offset, for example, add the indication information to measurement configuration information or secondary cell/secondary base station adding information in an RRC connection reconfiguration message, to request the UE to report the timing offset, and the UE adds the timing offset to a measurement report or an RRC connection reconfiguration complete message and sends the measurement report or the RRC connection reconfiguration complete message to the secondary base station. Alternatively, the indication information may also be implicit, for example, the timing offset reported by the UE is received by using an opportunity that is negotiated with the UE in advance and that is used to report the timing offset, for example, when the UE receives a secondary cell/secondary base station adding request, the UE automatically adds a timing offset between a currently added secondary cell/secondary base station and the PCell to a response message (an RRC connection reconfiguration complete message).

Optionally, the acquiring module 901 is specifically configured to:

receive the corrected measurement gap information that is sent by the primary base station by using a notification message or an update message.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

The time gap of the M consecutive subframes and the time gap of the N consecutive subframes separately start from a first offset and a second offset of a measurement period.

In this embodiment, that the N subframes include the M subframes may refer to that a time corresponding to the N subframes cover a time corresponding to the M subframes; or may refer to that the M subframes are a subset of the N subframes.

In this embodiment of the present invention, that M=7 and N=6 is used as an example for description, but it should be noted that only an exemplary description is provided herein, and this embodiment of the present invention is not limited thereto.

Specifically, measurement gaps may be classified into two models: model 0 and model 1. In model 0, 40 milliseconds (a length of four frames) are one measurement period, and a measurement gap is 6 milliseconds (six subframes), and in model 1, 80 milliseconds (a length of eight frames) are one measurement period, and a measurement gap is 6 milliseconds.

As shown in FIG. 7, in an LTE system, a time domain is divided into frame and subframe, one frame occupies 10 milliseconds, one frame includes 10 subframes, and each subframe is 1 millisecond. That the primary base station and the secondary base station are asynchronous refers to that at a same moment, frame numbers and subframe numbers of the primary base station and the secondary base station are different and/or subframe boundaries of the primary base station and the secondary base station are unaligned. The timing offset refers to a difference (because subframe boundaries are unaligned, the difference may have a decimal) between frame numbers of the primary base station and the secondary base station at a same moment and a difference between subframe numbers of the primary base station and the secondary base station at a same moment, or refers to a difference between a time corresponding to a frame number of the primary base station and a time corresponding to the same frame number of the secondary base station and a difference between a time corresponding to a subframe number of the primary base station and a time corresponding to the same subframe number of the secondary base station.

A transmitted timing offset may be obtained by rounding down or rounding up an actual timing offset, to facilitate transmission. A transmitted timing offset may be in different formats, for example, two integers are used, a first integer is a frame difference a, and a second integer is a subframe difference b, or one integer is used to indicate a subframe or millisecond difference (assuming that the difference is c), where actually, c=10*a+b. Certainly, a timing offset of a finer granularity may also be reported, for example, microsecond (μs); however, corresponding signaling overheads are higher. In this embodiment of the present invention, a method of using one integer whose unit is subframe and that is obtained by rounding down is used as an example for description, and other methods are obtained by analogy.

After the timing offset is acquired, a formula for calculating the corrected measurement gap information is as follows:

a corrected measurement gap value=(a measurement gap value+the timing offset)mod 40 or 80.

After correction, the corrected measurement gap information and the measurement gap information include a same measurement period. If a measurement gap model is model 0 (a measurement period of 40 milliseconds), 40 is used to perform a modulo operation in the foregoing formula; and if a measurement gap model is model 1 (a measurement period of 80 milliseconds), 80 is used to perform a modulo operation in the foregoing formula.

The first offset included in the corrected measurement gap information is the corrected measurement gap value in the foregoing formula; and the second offset included in the measurement gap information is the measurement gap value in the foregoing formula.

For a measurement gap sent to the UE, six consecutive subframes starting from the second offset, that is, a measurement gap value indicated by the measurement gap information are a measurement gap period; but for a corrected measurement gap, seven consecutive subframes starting from the first offset, that is, a corrected measurement gap value indicated by the corrected measurement gap information are a measurement gap period, to avoid a problem caused by unaligned subframe boundaries.

For example: as shown in FIG. 8, an actual timing offset is: (105*10+1.x)−30*10=751.x, where x is a difference between subframe boundaries (a difference between a boundary of subframe 1 in frame 105 and a boundary of subframe 0 in frame 30), and a time point of frame 30 of the primary cell is used as a start time. Frame 30 of the primary cell and frame 105 of a target cell are randomly selected values, and are not limited in the present invention. In a manner, a time corresponding to frame 30 of the primary cell is the same as or close to a time corresponding to frame 105 of the target cell.

A transmitted timing offset is obtained by rounding down an actual timing offset, and is 751.

If a measurement gap model is model 0 (the measurement period is 40 milliseconds), and an offset indicated by the measurement gap information is 21 (that is, the second offset) (for a corresponding measurement gap period, refer to a gray part of the primary cell) (a measurement period starts from frame 28, and the measurement period starts from a frame number mod 4=0, or a frame number mod 8=0 (corresponding to model 1)), the first offset included in the corrected measurement gap information is: (751+21) mod 40=12 (for a corresponding corrected measurement gap period, refer to a gray part of the target cell) (the period starts from frame 104), and a measurement gap period lasts for seven subframes, where a measurement gap model is also model 0 (a measurement period is 40 milliseconds).

In this embodiment, a secondary base station acquires corrected measurement gap information, where the corrected measurement gap information is corrected measurement gap information calculated by the secondary base station itself according to measurement gap information and a timing offset between a primary base station of UE and the secondary base station of the UE, or receives corrected measurement gap information sent by a primary base station, and the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

Figure 10:
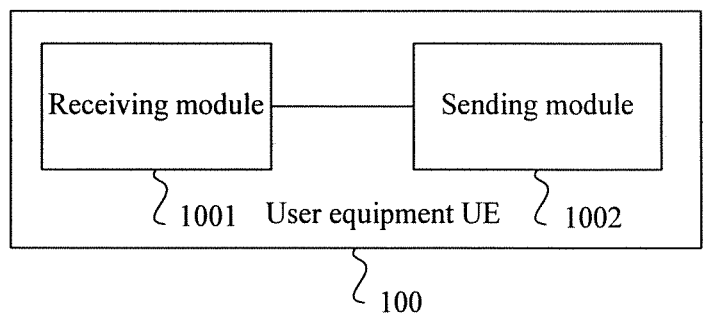
FIG. 10 is a schematic structural diagram of Embodiment 1 of UE according to the present invention.

FIG. 10 is a schematic structural diagram of Embodiment 1 of UE according to the present invention. This embodiment may be executed by UE, and the UE may be implemented by using software and/or hardware. The solution of this embodiment is applied to a primary base station, a secondary base station, and user equipment, to implement measurement gap configuration for inter-base station carrier aggregation.

As shown in FIG. 10, UE 100 in this embodiment may include: a receiving module 1001 and a sending module 1002. The receiving module 1001 is configured to receive measurement gap information sent by a primary base station of the UE, where the measurement gap information is used to instruct the UE to perform measurement in a measurement gap period indicated by the measurement gap information, so that the primary base station acquires corrected measurement gap information according to a timing offset; and the sending module 1002 is configured to send the timing offset between the primary base station and a secondary base station of the UE to the primary base station; or send, to the primary base station, corrected measurement gap information that is calculated according to the measurement gap information and the timing offset between the primary base station and the secondary base station of the UE, where the corrected measurement gap information is used by the primary base station to instruct the secondary base station to stop scheduling the UE in a measurement gap period indicated by the corrected measurement gap information.

Specifically, as shown in FIG. 4, the receiving module 1001 of the UE receives the measurement gap information sent by the primary base station, so that the corrected measurement gap information is calculated and the sending module 1002 sends the corrected measurement gap information to the primary base station. The primary base station forwards the corrected measurement gap information to the secondary base station, and after receiving the corrected measurement gap information, the secondary base station stops scheduling the UE in the corrected measurement gap period, where the corrected measurement gap information is calculated according to the measurement gap information and the timing offset. For inter-base station carrier aggregation, the primary base station and the secondary base station of the UE may be asynchronous, and the timing offset refers to a timing offset between the primary base station of the UE and the secondary base station of the UE, or may be understood as a timing offset between a cell of the primary base station and a cell of the secondary base station. The timing offset is generally a time offset relative to a primary cell (Primary Cell, PCell for short) of the primary base station of the UE, that is, a time offset between the primary cell and any cell of the secondary base station. Serving cells of the primary base station of the UE may be considered as a master cell group (Master Cell Group), and all serving cells of each secondary base station may be considered as a secondary cell group (Secondary Cell Group). For a cell group, the timing offset refers to a timing offset between a master cell group and a secondary cell group. It should be noted that this embodiment of the present invention is described by using the primary base station and the secondary base station, but is also applicable to the concept of a cell group. Alternatively, as shown in FIG. 3, the receiving module 1001 of the UE receives the measurement gap information sent by the primary base station, and the sending module 1002 sends the timing offset between the primary base station and the secondary base station of the UE to the primary base station, so that the primary base station acquires the corrected measurement gap information according to the timing offset. The primary base station calculates the corrected measurement gap information, and forwards the corrected measurement gap information to the secondary base station, and after receiving the corrected measurement gap information, the secondary base station does not schedule the UE in the corrected measurement gap period.

Optionally, the receiving module 1001 is specifically configured to receive the measurement gap information that is sent by the primary base station by using a RRC connection reconfiguration message; and the sending module 1002 is specifically configured to send the corrected measurement gap information to the primary base station by using an RRC connection reconfiguration complete message.

Specifically, as shown in FIG. 3 and FIG. 4, the receiving module 1001 of the UE may receive the measurement gap information that is sent by the primary base station by using an RRC connection reconfiguration message, and after the UE receives the measurement gap information, the UE replies with a response message, that is, an RRC connection reconfiguration complete message to the primary base station by using the sending module 1002, and the UE does not receive data on the primary base station and the secondary base station and performs measurement in the measurement gap period.

In this embodiment, UE receives measurement gap information sent by a primary base station, and sends a timing offset to the primary base station, to calculate corrected measurement gap information, or UE directly sends calculated corrected measurement gap information, and the primary base station sends the corrected measurement gap information to a secondary base station, so that after acquiring the corrected measurement gap information, the secondary base station does not schedule the UE in a corrected measurement gap period. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

In Embodiment 2 of the UE of the present invention, based on the embodiment shown in FIG. 10, in the UE in this embodiment, further, the sending module 1001 is specifically configured to: after a request message sent by the primary base station is received, send the timing offset, where the request message is used to request the UE to acquire the timing offset and report the timing offset to the primary base station; or send the timing offset after a message that includes indication information and that is sent by the primary base station to the UE is received, where the indication information is used to request the UE to acquire the timing offset and report the timing offset to the primary base station; or send the timing offset to the primary base station by using an opportunity that is negotiated with the primary base station in advance and that is used to report the timing offset.

Specifically, as shown in FIG. 5, after the request message, for example, a timing offset request message, sent by the primary base station is received, the sending module

1001 of the UE reports the timing offset to the primary base station, where the timing offset request message may further include a target cell identifier or a target base station identifier (in this embodiment, the target cell identifier may be an identifier of a cell of the secondary base station of the UE, and the target base station identifier may be an identifier of the secondary base station). The UE may add the timing offset to a request response message and send the request response message to the primary base station, for example, add the timing offset to a timing offset request response message. In this embodiment, the timing offset is between two cells. For one UE, serving cells of a same base station are synchronous. In an implementation manner of acquiring a timing offset between cells of a primary base station and a target base station, a primary cell PCell or any serving cell of the primary base station is used as a cell of the primary base station, the target base station is the current secondary base station of the UE or a base station specified in the timing offset request message, and a specified target cell or any serving cell of the target base station is used as a cell of the target base station. That is, for example: the UE acquires a timing offset between any serving cell of the primary base station and any serving cell of the target base station, or the UE acquires a timing offset between the primary cell PCell of the primary base station and any serving cell of the target base station, or the UE acquires a timing offset between the primary cell PCell or any serving cell of the primary base station and a specified target cell, or the like.

Alternatively, as shown in FIG. 6, the primary base station may also add indication information to a message sent to the UE, where the indication message is used to request the UE to report the timing offset, for example, the primary base station adds the indication information to measurement configuration information or secondary cell/secondary base station adding information in an RRC connection reconfiguration message, to request the UE to report the timing offset, and the UE may add the timing offset to a measurement report or an RRC connection reconfiguration complete message and sends the measurement report or the RRC connection reconfiguration complete message to the primary base station. Alternatively, the indication information may also be implicit, for example, the UE sends the timing offset by using an opportunity that is negotiated with the primary base station in advance and that is used to report the timing offset, for example, when the UE receives a secondary cell/secondary base station adding request, the UE automatically adds a timing offset between a currently added secondary cell/secondary base station and the PCell to a response message (an RRC connection reconfiguration complete message).

In consideration of different locations of UEs, transmission delays after which radio signals arrive at the UEs are different; therefore, timing offsets acquired from the UEs are more accurate.

In this embodiment, the UE may also communicate with the secondary base station, to transmit the timing offset, and the foregoing manner may also be used.

In this embodiment, UE receives a message that is sent by a primary base station and that carries a timing offset request, and sends a timing offset to the primary base station, to calculate corrected measurement gap information, and the primary base station sends the corrected measurement gap information to a secondary base station, so that the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement gap configuration mechanism after inter-base station carrier aggregation is introduced.

Figure 11:
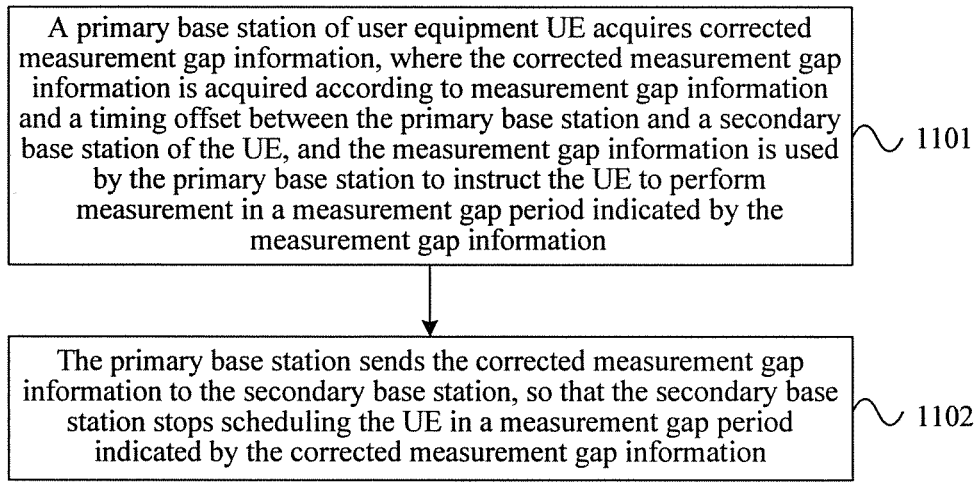
FIG. 11 is a flowchart of Embodiment 1 of a measurement method for inter-base station carrier aggregation according to the present invention.

FIG. 11 is a flowchart of Embodiment 1 of a measurement method for inter-base station carrier aggregation according to the present invention. This embodiment is executed by a primary base station of UE, and the primary base station may be implemented by using software and/or hardware. The solution of this embodiment is applied to a primary base station, a secondary base station, and user equipment, to implement measurement gap configuration for inter-base station carrier aggregation. As shown in FIG. 11, the method in this embodiment includes:

Step 1101. A primary base station of UE acquires corrected measurement gap information, where the corrected measurement gap information is acquired according to measurement gap information and a timing offset between the primary base station and a secondary base station of the UE, and the measurement gap information is used by the primary base station to instruct the UE to perform measurement in a measurement gap period indicated by the measurement gap information.

Step 1102. The primary base station sends the corrected measurement gap information to the secondary base station, so that the secondary base station stops scheduling the UE in a measurement gap period indicated by the corrected measurement gap information.

Optionally, the acquiring, by a primary base station, corrected measurement gap information includes:

calculating, by the primary base station, the corrected measurement gap information according to the measurement gap information and the timing offset; or receiving, by the primary base station, the corrected measurement gap information that is calculated according to the measurement gap information and the timing offset and that is sent by the UE.

Optionally, before the calculating, by the primary base station, the corrected measurement gap information according to the measurement gap information and the timing offset, the method includes:

sending, by the primary base station, a request message to the UE, where the request message is used to request the UE to acquire the timing offset and report the timing offset to the primary base station; or sending, by the primary base station, a message including indication information to the UE, where the indication information is used to request the UE to report the timing offset; or receiving, by the primary base station by using an opportunity that is negotiated with the UE in advance and that is used to report the timing offset, the timing offset reported by the UE.

Optionally, the method in this embodiment may further include:

sending, by the primary base station, a RRC connection reconfiguration message to the UE, where the RRC connection reconfiguration message includes the measurement gap information; and the receiving, by the primary base station, the corrected measurement gap information that is calculated according to the measurement gap information and the timing offset and that is sent by the UE specifically includes:

receiving, by the primary base station, an RRC connection reconfiguration complete message sent by the UE, where the RRC connection reconfiguration complete message includes the corrected measurement gap information that is calculated by the UE according to the measurement gap information and the timing offset.

Optionally, the sending, by the primary base station, the corrected measurement gap information to the secondary base station includes:

sending, by the primary base station, the corrected measurement gap information to the secondary base station by using a notification message such as a measurement gap notification message, or an update message such as a UE information update message.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

In the method in this embodiment, the structure in Embodiment 1 and Embodiment 2 of the base station may be used to perform the technical solution of the method in this embodiment, an implementation principle and a technical effect thereof are similar, and details are not described herein again.

Figure 12:
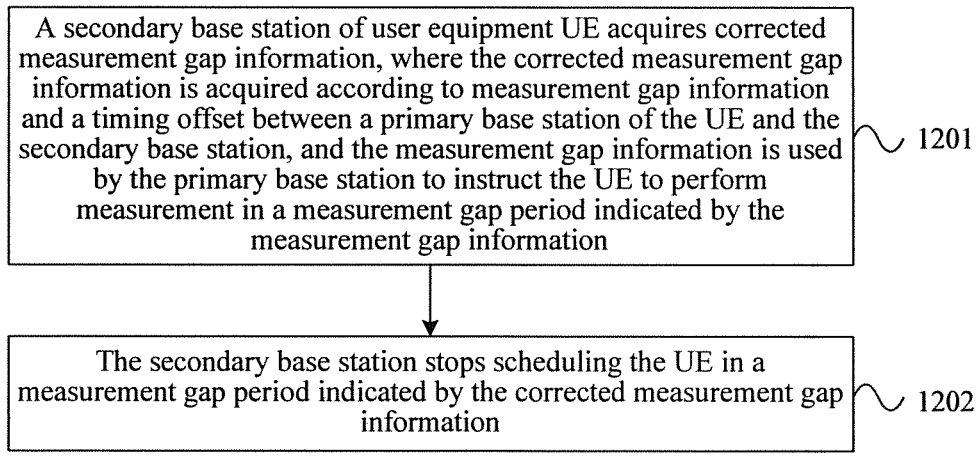
FIG. 12 is a flowchart of Embodiment 2 of a measurement method for inter-base station carrier aggregation according to the present invention.

FIG. 12 is a flowchart of Embodiment 2 of a measurement gap configuration method for inter-base station carrier aggregation according to the present invention. This embodiment is executed by a secondary base station of UE, and the secondary base station may be implemented by using software and/or hardware. The solution of this embodiment is applied to a primary base station, a secondary base station, and user equipment, to implement measurement gap configuration for inter-base station carrier aggregation. As shown in FIG. 12, the method in this embodiment may include:

Step 1201. A secondary base station of UE acquires corrected measurement gap information, where the corrected measurement gap information is acquired according to measurement gap information and a timing offset between a primary base station of the UE and the secondary base station, and the measurement gap information is used by the primary base station to instruct the UE to perform measurement in a measurement gap period indicated by the measurement gap information.

Step 1202. The secondary base station stops scheduling the UE in a measurement gap period indicated by the corrected measurement gap information.

Optionally, the acquiring, by a secondary base station, corrected measurement gap information includes:

receiving, by the secondary base station, the corrected measurement gap information sent by the primary base station of the UE; or calculating, by the secondary base station, the corrected measurement gap information according to the measurement gap information and the timing offset.

Optionally, the receiving, by the secondary base station, the corrected measurement gap information sent by the primary base station of the UE includes:

receiving, by the secondary base station, the corrected measurement gap information that is calculated by the primary base station according to the measurement gap information and the timing offset; or receiving, by the secondary base station, the corrected measurement gap information that is calculated by the UE according to the measurement gap information and the timing offset and that is sent by the primary base station.

Optionally, the receiving, by the secondary base station, the corrected measurement gap information sent by the primary base station of the UE includes:

receiving, by the secondary base station, the corrected measurement gap information that is sent by the primary base station by using a notification message or an update message.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

In the method in this embodiment, the structure in Embodiment 3 of the base station may be used to perform the technical solution of the method in this embodiment, an implementation principle and a technical effect thereof are similar, and details are not described herein again.

Figure 13:
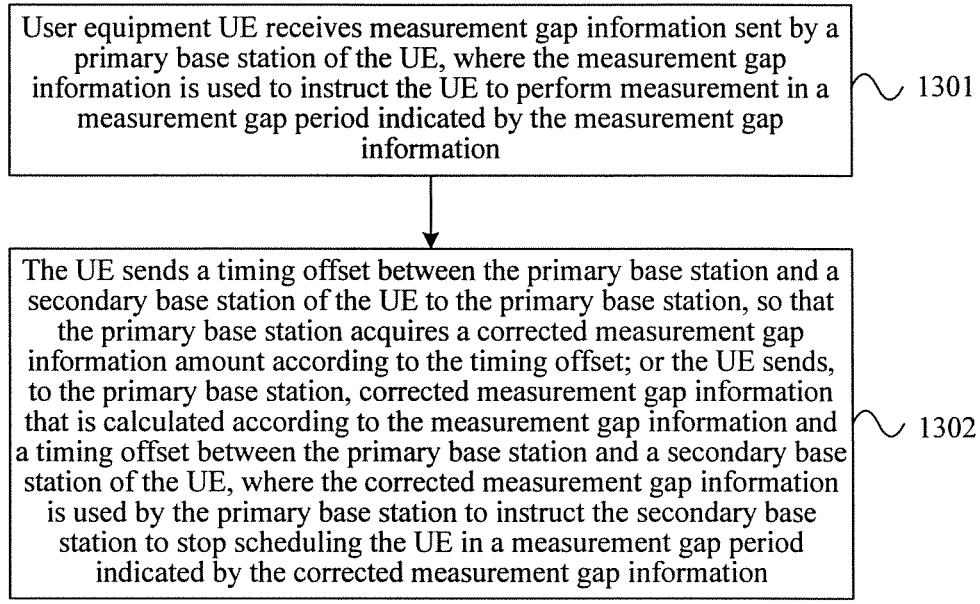
FIG. 13 is a flowchart of Embodiment 3 of a measurement method for inter-base station carrier aggregation according to the present invention.

FIG. 13 is a flowchart of Embodiment 3 of a measurement gap configuration method for inter-base station carrier aggregation according to the present invention. This embodiment is executed by UE, and the UE may be implemented by using software and/or hardware. The solution of this embodiment is applied to a primary base station, a secondary base station, and user equipment, to implement measurement gap configuration for inter-base station carrier aggregation. As shown in FIG. 13, the method in this embodiment may include:

Step 1301. UE receives measurement gap information sent by a primary base station of the UE, where the measurement gap information is used to instruct the UE to perform measurement in a measurement gap period indicated by the measurement gap information.

Step 1302. The UE sends a timing offset between the primary base station and a secondary base station of the UE to the primary base station, so that the primary base station acquires corrected measurement gap information according to the timing offset; or the UE sends, to the primary base station, corrected measurement gap information that is calculated according to the measurement gap information and a timing offset between the primary base station and a secondary base station of the UE, where the corrected measurement gap information is used by the primary base station to instruct the secondary base station to stop scheduling the UE in a measurement gap period indicated by the corrected measurement gap information.

Optionally, the receiving, by UE, measurement gap information sent by a primary base station includes:

receiving, by the UE, the measurement gap information that is sent by the primary base station by using a RRC connection reconfiguration message; and correspondingly, the sending, by the UE to the primary base station, corrected measurement gap information that is calculated according to the measurement gap information and a timing offset between the primary base station and a secondary base station of the UE includes:

sending, by the UE, the corrected measurement gap information to the primary base station by using an RRC connection reconfiguration complete message.

Optionally, the sending, by the UE, a timing offset between the primary base station and a secondary base station of the UE to the primary base station includes:

sending, by the UE, the timing offset after receiving a request message sent by the primary base station, where the request message is used to request the UE to acquire the timing offset and report the timing offset to the primary base station; or sending, by the UE, the timing offset after receiving a message that includes indication information and that is sent by the primary base station to the UE, where the indication information is used to request the UE to acquire the timing offset and report the timing offset to the primary base station; or sending, by the UE, the timing offset to the primary base station by using an opportunity that is negotiated with the primary base station in advance and that is used to report the timing offset.

In the method in this embodiment, the structure in the embodiment of the UE may be used to perform the technical solution of the method in this embodiment, an implementation principle and a technical effect thereof are similar, and details are not described herein again.

Figure 14:
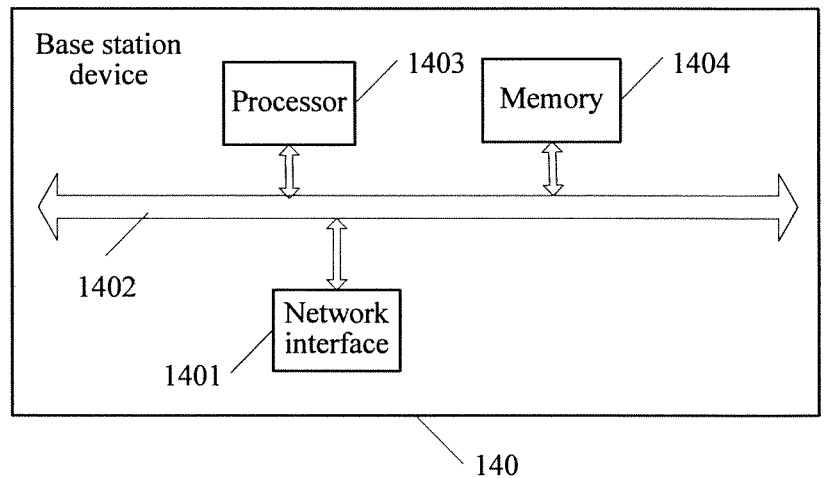
FIG. 14 is a schematic structural diagram of Embodiment 1 of a base station device according to the present invention.

FIG. 14 is a schematic structural diagram of Embodiment 1 of a base station device according to the present invention. As shown in FIG. 14, the base station device 140 provided in this embodiment includes a network interface 1401, a bus 1402, a processor 1403, and a memory 1404, where the network interface 1401, the memory 1404, and the processor 1403 are connected to the bus 1402. The base station device in this embodiment may be a primary base station of user equipment, and the base station device 140 may further include a transmitter and a receiver. The transmitter and the receiver may be connected to the network interface 1401. The transmitter is configured to send data or information, the receiver is configured to receive data or information, and the memory 1404 is configured to store an execution instruction. When the base station device 140 runs, the processor 1403 and the memory 1404 communicate with each other, and the processor 1403 is configured to invoke the execution instruction in the memory 1404 to perform the following steps:

acquiring corrected measurement gap information, where the corrected measurement gap information is acquired according to measurement gap information and a timing offset between a primary base station of UE and a secondary base station of the UE, and the measurement gap information is used by the primary base station to instruct the UE to perform measurement in a measurement gap period indicated by the measurement gap information; and sending the corrected measurement gap information to the secondary base station by means of the network interface 1401, so that the secondary base station stops scheduling the UE in a measurement gap period indicated by the corrected measurement gap information.

Optionally, the acquiring corrected measurement gap information includes:

calculating the corrected measurement gap information according to the measurement gap information and the timing offset; or receiving, by means of the network interface 1401, the corrected measurement gap information that is calculated according to the measurement gap information and the timing offset and that is sent by the UE.

Optionally, before the calculating the corrected measurement gap information according to the measurement gap information and the timing offset, the processor is further configured to perform the following steps:

sending a request message to the UE by means of the network interface 1401, where the request message is used to request the UE to acquire the timing offset and report the timing offset to the base station; or sending a message including indication information to the UE by means of the network interface 1401, where the indication information is used to request the UE to report the timing offset; or receiving, by means of the network interface 1401 and by using an opportunity that is negotiated with the UE in advance and that is used to report the timing offset, the timing offset reported by the UE.

Optionally, the processor is further configured to perform the following steps:

sending a RRC connection reconfiguration message to the UE by means of the network interface 1401, where the RRC connection reconfiguration message includes the measurement gap information; and the receiving, by means of the network interface 1401, the corrected measurement gap information that is calculated according to the measurement gap information and the timing offset and that is sent by the UE specifically includes:

receiving, by means of the network interface 1401, an RRC connection reconfiguration complete message sent by the UE, where the RRC connection reconfiguration complete message includes the corrected measurement gap information that is calculated by the UE according to the measurement gap information and the timing offset.

Optionally, the sending the corrected measurement gap information to the secondary base station by means of the network interface 1401 includes:

sending the corrected measurement gap information to the secondary base station by means of the network interface 1401 and by using a notification message or an update message.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

In this embodiment, a base station device acquires corrected measurement gap information that is calculated according to measurement gap information and a timing offset between a primary base station of UE and a secondary base station of the UE, and sends the corrected measurement gap information to the secondary base station, so that the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

Figure 15:
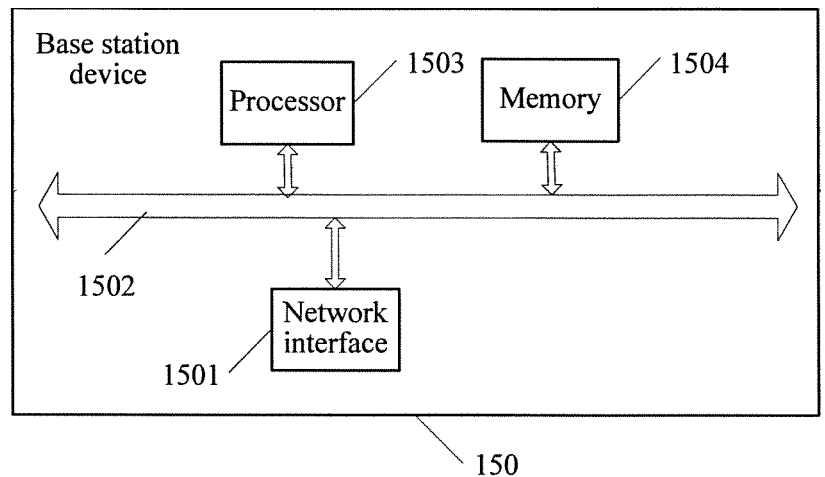
FIG. 15 is a schematic structural diagram of Embodiment 2 of a base station device according to the present invention.

FIG. 15 is a schematic structural diagram of Embodiment 2 of a base station device according to the present invention. As shown in FIG. 15, a base station device 150 provided in this embodiment includes a network interface 1501, a bus 1502, a processor 1503, and a memory 1504, where the network interface 1501, the memory 1504, and the processor 1503 are connected to the bus 1502. The base station device in this embodiment may be a secondary base station of user equipment. The base station device 150 may further include a transmitter and a receiver. The transmitter and the receiver may be connected to the network interface 1501. The transmitter is configured to send data or information, the receiver is configured to receive data or information, and the memory 1504 is configured to store an execution instruction. When the base station device 150 runs, the processor 1503 and the memory 1504 communicate with each other, and the processor 1503 invokes the execution instruction in the memory 1504 to perform the following steps:

acquiring corrected measurement gap information, where the corrected measurement gap information is acquired according to measurement gap information and a timing offset between a primary base station of UE and a secondary base station of the UE, and the measurement gap information is used by the primary base station to instruct the UE to perform measurement in a measurement gap period indicated by the measurement gap information; and stopping scheduling the UE in a measurement gap period indicated by the corrected measurement gap information.

Optionally, the acquiring corrected measurement gap information includes:

receiving, by means of the network interface 1501, the corrected measurement gap information sent by the primary base station of the UE; or calculating the corrected measurement gap information according to the measurement gap information and the timing offset.

Optionally, the receiving, by means of the network interface 1501, the corrected measurement gap information sent by the primary base station of the UE includes:

receiving, by means of the network interface 1501, the corrected measurement gap information that is calculated by the primary base station according to the measurement gap information and the timing offset; or receiving, by means of the network interface 1501, the corrected measurement gap information that is calculated by the UE according to the measurement gap information and the timing offset and that is sent by the primary base station.

Optionally, the receiving, by means of the network interface 1501, the corrected measurement gap information sent by the primary base station of the UE includes:

receiving, by means of the network interface 1501, the corrected measurement gap information sent by the primary base station by using a notification message or an update message.

Optionally, the corrected measurement gap information and the measurement gap information include a same measurement period; and the corrected measurement gap information includes a first offset, the measurement gap information includes a second offset, and the first offset is a value obtained after a modulo operation is performed on a sum of the second offset and the timing offset by the measurement period.

Optionally, the measurement gap period indicated by the measurement gap information includes a time gap of M consecutive subframes, where M is a positive integer; and the measurement gap period indicated by the corrected measurement gap information includes a time gap of N consecutive subframes, where N is a positive integer, and the N subframes include the M subframes.

In this embodiment, a secondary base station acquires corrected measurement gap information, where the corrected measurement gap information is corrected measurement gap information calculated by the secondary base station itself according to measurement gap information and a timing offset between a primary base station of UE and the secondary base station of the UE, or receives corrected measurement gap information sent by a primary base station, and the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

Figure 16:
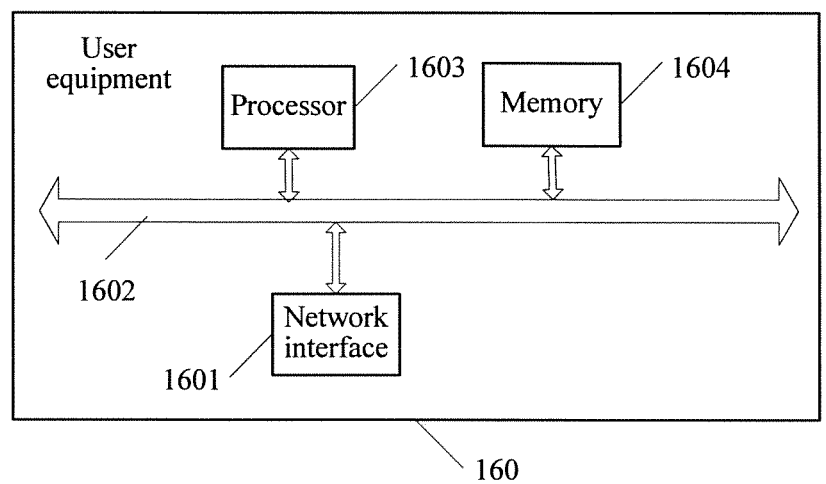
FIG. 16 is a schematic structural diagram of Embodiment 1 of user equipment according to the present invention.

FIG. 16 is a schematic structural diagram of Embodiment 1 of user equipment according to the present invention. As shown in FIG. 16, user equipment 160 provided in this embodiment includes a network interface 1601, a bus 1602, a processor 1603, and a memory 1604, where the network interface 1601, the memory 1604, and the processor 1603 are connected to the bus 1602. The user equipment 160 may further include a transmitter and a receiver. The transmitter and the receiver may be connected to the network interface 1601. The transmitter is configured to send data or information, the receiver is configured to receive data or information, and the memory 1604 is configured to store an execution instruction. When the user equipment 160 runs, the processor 1603 and the memory 1604 communicate with each other, and the processor 1603 invokes the execution instruction in the memory 1604 to perform the following steps:

receiving, by means of the network interface 1601, measurement gap information sent by a primary base station of the UE, where the measurement gap information is used to instruct the UE to perform measurement in a measurement gap period indicated by the measurement gap information; and sending a timing offset between the primary base station and a secondary base station of the UE to the primary base station by means of the network interface 1601, so that the primary base station acquires corrected measurement gap information according to the timing offset; or sending, to the primary base station by means of the network interface 1601, corrected measurement gap information that is calculated according to the measurement gap information and a timing offset between the primary base station and a secondary base station of the UE, where the corrected measurement gap information is used by the primary base station to instruct the secondary base station to stop scheduling the UE in a measurement gap period indicated by the corrected measurement gap information.

Optionally, the receiving, by means of the network interface 1601, measurement gap information sent by a primary base station of the UE includes:

receiving, by means of the network interface 1601, the measurement gap information that is sent by the primary base station by using a RRC connection reconfiguration message; and the sending, to the primary base station by means of the network interface 1601, corrected measurement gap information that is calculated according to the measurement gap information and a timing offset between the primary base station and a secondary base station of the UE includes:

sending the corrected measurement gap information to the primary base station by means of the network interface 1601 and by using an RRC connection reconfiguration complete message.

Optionally, the sending a timing offset between the primary base station and a secondary base station of the UE to the primary base station by means of the network interface 1601 includes:

sending, by means of the network interface 1601, the timing offset after receiving, by means of the network interface 1601, a request message sent by the primary base station, where the request message is used to request the UE to acquire the timing offset and report the timing offset to the primary base station; or sending, by means of the network interface 1601, the timing offset after receiving, by means of the network interface 1601, a message that includes indication information and that is sent by the primary base station to the UE, where the indication information is used to request the UE to acquire the timing offset and report the timing offset to the primary base station; or sending, by the UE by means of the network interface 1601, the timing offset to the primary base station by using an opportunity that is negotiated with the primary base station in advance and that is used to report the timing offset.

In this embodiment, UE receives a message that is sent by a primary base station and that carries a timing offset request, and sends a timing offset to the primary base station, to calculate corrected measurement gap information, and the primary base station sends the corrected measurement gap information to a secondary base station, so that the secondary base station stops scheduling the UE in a measurement gap period indicated by the corrected measurement gap information. Therefore, the secondary base station stops scheduling the user equipment in the measurement gap period of the UE, which avoids waste of an air interface resource, improves the network transmission efficiency, and resolves the problem of how to design a measurement mechanism for inter-base station carrier aggregation.

In the several embodiments provided in the present application, it should be understood that the disclosed device and method may be implemented in other manners. For example, the described device embodiment is merely exemplary. For example, the unit or module division is merely logical function division and may be other division in actual implementation. For example, a plurality of units or modules may be combined or integrated into another system, or some features may be ignored or not performed. In addition, the displayed or discussed mutual couplings or direct couplings or communication connections may be implemented by using some interfaces. The indirect couplings or communication connections between the devices or modules may be implemented in electronic, mechanical, or other forms.

The modules described as separate parts may or may not be physically separate, and parts displayed as modules may or may not be physical modules, may be located in one position, or may be distributed on a plurality of network units. Some or all of the modules may be selected according to actual requirements to achieve the objectives of the solutions of the embodiments.

Persons of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present invention, but not for limiting the present invention. Although the present invention is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present invention.

What is claimed is:

1. A base station, comprising:
   a first transmitter, configured to send a message including indication information to a user equipment device (UE) for requesting the UE to report a timing offset between a primary cell (PCell) of the base station and a cell of a secondary base station of the UE; and
   a receiver, configured to receive the timing offset from the UE;
   wherein the timing offset enables the secondary base station to obtain corrected measurement gap information according to measurement gap information and the timing offset,
   wherein the measurement gap information enables the UE to perform measurement in a first measurement gap period indicated by the measurement gap information,
   wherein the corrected measurement gap information enables the secondary base station to skip scheduling the UE in a second measurement gap period indicated by the corrected measurement gap information, and
   wherein the first measurement gap period comprises a time gap of M consecutive subframes, M is a positive integer, the second measurement gap period comprises a time gap of N consecutive subframes, N is a positive integer, and the N subframes comprise the M subframes.

2. The base station according to claim 1, further comprising:
   a second transmitter, wherein the second transmitter is configured to send the measurement gap information and the timing offset to the secondary base station.

3. The base station according to claim 1, wherein the value of M is 6 and the value of N is 7.

4. The base station according to claim 1, wherein the timing offset comprises a difference between frame numbers of the PCell and the cell of the secondary base station at a same moment.

5. A base station, comprising:
   a receiver, configured to receive, from a primary base station of a user equipment device (UE), measurement gap information and a timing offset between a primary cell (PCell) of the primary base station and a cell of the base station; and a processor, configured to obtain corrected measurement gap information according to the measurement gap information and the timing offset, and skip scheduling the UE in a second measurement gap period indicated by the corrected measurement gap information;

wherein the measurement gap information enables the UE to perform measurement in a first measurement gap period indicated by the measurement gap information, and wherein the first measurement gap period comprises a time gap of M consecutive subframes, M is a positive integer, the second measurement gap period comprises a time gap of N consecutive subframes, N is a positive integer, and the N subframes comprise the M subframes.

6. The base station according to claim 5, wherein the value of M is 6 and the value of N is 7.

7. The base station according to claim 5, wherein the timing offset comprises a difference between frame numbers of the PCell and the cell of the secondary base station at a same moment.

8. A user equipment device (UE), comprising:
a receiver, configured to receive a message including indication information for requesting the UE to report a timing offset between a primary cell (PCell) of a primary base station of the UE and a cell of a secondary base station of the UE; and
a transmitter, configured to send the timing offset to the primary base station;
wherein the timing offset enables the secondary base station to obtain corrected measurement gap information according to measurement gap information and the timing offset,
wherein the corrected measurement gap information enables the secondary base station to skip scheduling the UE in a second measurement gap period indicated by the corrected measurement gap information, and
wherein the first measurement gap period comprises a time gap of M consecutive subframes, M is a positive integer, the second measurement gap period comprises a time gap of N consecutive subframes, N is a positive integer, and the N subframes comprise the M subframes.

9. The UE according to claim 8, wherein:
the message is a Radio Resource Control (RRC) connection reconfiguration message including a cell identifier of the cell of the secondary base station.

10. The UE according to claim 8, wherein the timing offset comprises a difference between frame numbers of the PCell and the cell of the secondary base station at a same moment.

11. The UE according to claim 8, wherein the value of M is 6 and the value of N is 7.

12. A communication method, comprising:
sending, by a primary base station of a user equipment device (UE), a message including indication information to the UE for requesting the UE to report a timing offset between a primary cell (PCell) of the primary base station and a cell of a secondary base station of the UE; and
receiving, by the primary base station, the timing offset from the UE;

wherein the timing offset enables the secondary base station to obtain corrected measurement gap information according to measurement gap information and the timing offset,
wherein the measurement gap information enables the UE to perform measurement in a first measurement gap period indicated by the measurement gap information,
wherein the corrected measurement gap information enables the secondary base station to skip scheduling the UE in a second measurement gap period indicated by the corrected measurement gap information, and
wherein the first measurement gap period comprises a time gap of M consecutive subframes, M is a positive integer, the second measurement gap period comprises a time gap of N consecutive subframes, N is a positive integer, and the N subframes comprise the M subframes.

13. The method according to claim 12, further comprising:
sending, by the primary base station, the timing offset and the measurement gap information to the secondary base station.

14. The method according to claim 12, wherein the value of M is 6 and the value of N is 7.

15. The method according to claim 12, wherein the timing offset comprises a difference between frame numbers of the PCell and the cell of the secondary base station at a same moment.

16. A communication method, comprising:
receiving, by a secondary base station of a user equipment device (UE), measurement gap information and a timing offset between a primary cell (PCell) of a primary base station of the UE and a cell of the secondary base station;
obtaining, by the secondary base station, corrected measurement gap information according to the measurement gap information and the timing offset; and
skipping, by the secondary base station, scheduling the UE in a second measurement gap period indicated by the corrected measurement gap information;
wherein the measurement gap information enables the UE to perform measurement in a first measurement gap period indicated by the measurement gap information, and
wherein the first measurement gap period comprises a time gap of M consecutive subframes, M is a positive integer, the second measurement gap period comprises a time gap of N consecutive subframes, N is a positive integer, and the N subframes comprise the M subframes.

17. The method according to claim 16, wherein the timing offset comprises a difference between frame numbers of the PCell and the cell of the secondary base station at a same moment.

18. The method according to claim 16, wherein the value of M is 6 and the value of N is 7.

19. A communication method, comprising:
receiving, by a user equipment device (UE), a message including indication information for requesting the UE to report a timing offset between a primary cell (PCell) of a primary base station of the UE and a cell of a secondary base station of the UE; and
sending, by the UE, the timing offset to the primary base station;

wherein the timing offset enables the secondary base station to obtain corrected measurement gap information according to measurement gap information and the timing offset, wherein the corrected measurement gap information enables the secondary base station to skip scheduling the UE in a second measurement gap period indicated by the corrected measurement gap information, and wherein the first measurement gap period comprises a time gap of M consecutive subframes, M is a positive integer, the second measurement gap period comprises a time gap of N consecutive subframes, N is a positive integer, and the N subframes comprise the M subframes.

20. The method according to claim 19, wherein the message is a Radio Resource Control (RRC) connection reconfiguration message including a cell identifier of the cell of the secondary base station.

21. The method according to claim 19, wherein the timing offset comprises a difference between frame numbers of the PCell and the cell of the secondary base station at a same moment.

22. The method according to claim 19, wherein the value of M is 6 and the value of N is 7.

* * * * *